United States Patent
Sulaiman et al.

(10) Patent No.: US 10,556,522 B2
(45) Date of Patent: Feb. 11, 2020

(54) ADJUSTMENT MECHANISM FOR AN OCCUPANT SUPPORT

(71) Applicant: FAURECIA AUTOSITZE GMBH, Stadthagen (DE)

(72) Inventors: Hosen Sulaiman, Dortmund (DE); Jörg Völlmecke, Porta Westfalica (DE); Markus Schenke, Petershagen (DE); Michael Schaper, Petershagen (DE); Jens Witt, Nienstädt (DE)

(73) Assignee: FAURECIA AUTOSITZE GMBH, Stadthagen (DE)

( * ) Notice: Subject to any disclaimer, the term of this patent is extended or adjusted under 35 U.S.C. 154(b) by 138 days.

(21) Appl. No.: 15/951,469

(22) Filed: Apr. 12, 2018

(65) Prior Publication Data
US 2018/0297493 A1    Oct. 18, 2018

(30) Foreign Application Priority Data

Apr. 18, 2017   (DE) .................. 10 2017 108 218

(51) Int. Cl.
| | |
|---|---|
| B60N 2/16 | (2006.01) |
| F16B 17/00 | (2006.01) |
| B60N 2/68 | (2006.01) |
| B21D 39/06 | (2006.01) |
| B21D 17/02 | (2006.01) |
| B21D 53/88 | (2006.01) |

(52) U.S. Cl.
CPC ......... B60N 2/1615 (2013.01); B21D 17/025 (2013.01); B21D 39/06 (2013.01); B21D 53/88 (2013.01); B60N 2/682 (2013.01); F16B 17/006 (2013.01)

(58) Field of Classification Search
CPC ..... B60N 2/1615; B60N 2/1814; B60N 2/682
See application file for complete search history.

(56) References Cited

U.S. PATENT DOCUMENTS

| | | | |
|---|---|---|---|
| 6,435,613 B1 * | 8/2002 | Kupietz ............... | B60N 2/1615 297/338 |
| 10,059,456 B2 * | 8/2018 | Le ...................... | B64D 11/0696 |
| 10,358,052 B1 * | 7/2019 | Mizukoshi ............ | B60N 2/165 |
| 2015/0321239 A1 * | 11/2015 | Dannheisig ........... | B21D 39/00 29/509 |
| 2015/0336477 A1 * | 11/2015 | Matsui .................. | B60N 2/682 297/344.15 |
| 2018/0079326 A1 * | 3/2018 | Hayashi ............... | B60N 2/0232 |

(Continued)

FOREIGN PATENT DOCUMENTS

| | | |
|---|---|---|
| DE | 102005007716 A1 | 8/2006 |
| DE | 102013112462 A1 | 5/2015 |

(Continued)

OTHER PUBLICATIONS

German Office Action for German App. No. DE 10 2017 108 218.2 dated Dec. 17, 2012, 7 pages.

*Primary Examiner* — Timothy J Brindley
(74) *Attorney, Agent, or Firm* — Barnes & Thornburg LLP

(57) ABSTRACT

A height adjustment device of a motor vehicle seat and a method for the production thereof includes a transverse pipe and a pair of links. The transverse pipe has two end-side bearing regions which merge in a central region having a larger diameter and each link rests on a bearing region of the transverse pipe.

7 Claims, 2 Drawing Sheets

(56) References Cited

U.S. PATENT DOCUMENTS

| | | | |
|---|---|---|---|
| 2018/0297492 A1* | 10/2018 | Sulaiman | B60N 2/167 |
| 2018/0319292 A1* | 11/2018 | Bonk | B60N 2/045 |
| 2019/0283631 A1* | 9/2019 | Mizukoshi | B60N 2/1615 |
| 2019/0291609 A1* | 9/2019 | Mike | B60N 2/168 |
| 2019/0308527 A1* | 10/2019 | Nakamura | B60N 2/10 |

FOREIGN PATENT DOCUMENTS

| | | | | |
|---|---|---|---|---|
| DE | 102014112919 A1 * | 3/2016 | | B60N 2/1615 |
| FR | 2992241 B1 * | 7/2014 | | B21D 39/06 |
| FR | 3008361 B1 * | 11/2016 | | B60N 2/68 |
| WO | WO-2010144084 A1 * | 12/2010 | | B60N 2/0232 |
| WO | WO-2013013955 A1 * | 1/2013 | | B60N 2/68 |

\* cited by examiner

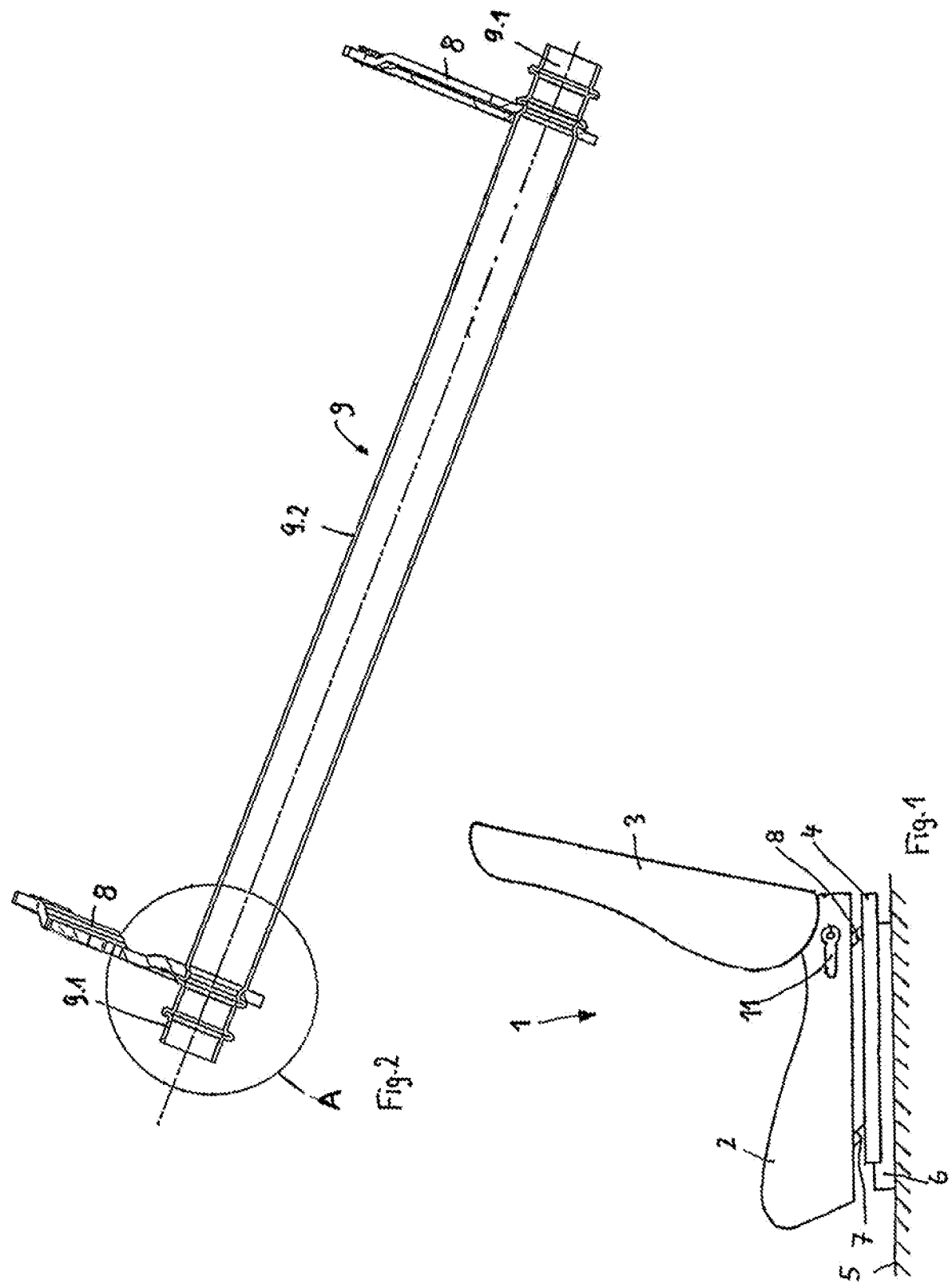

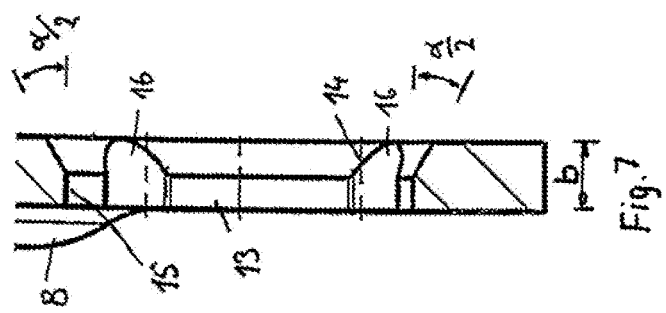
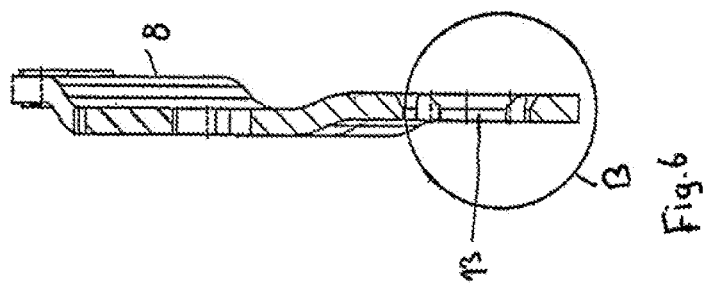
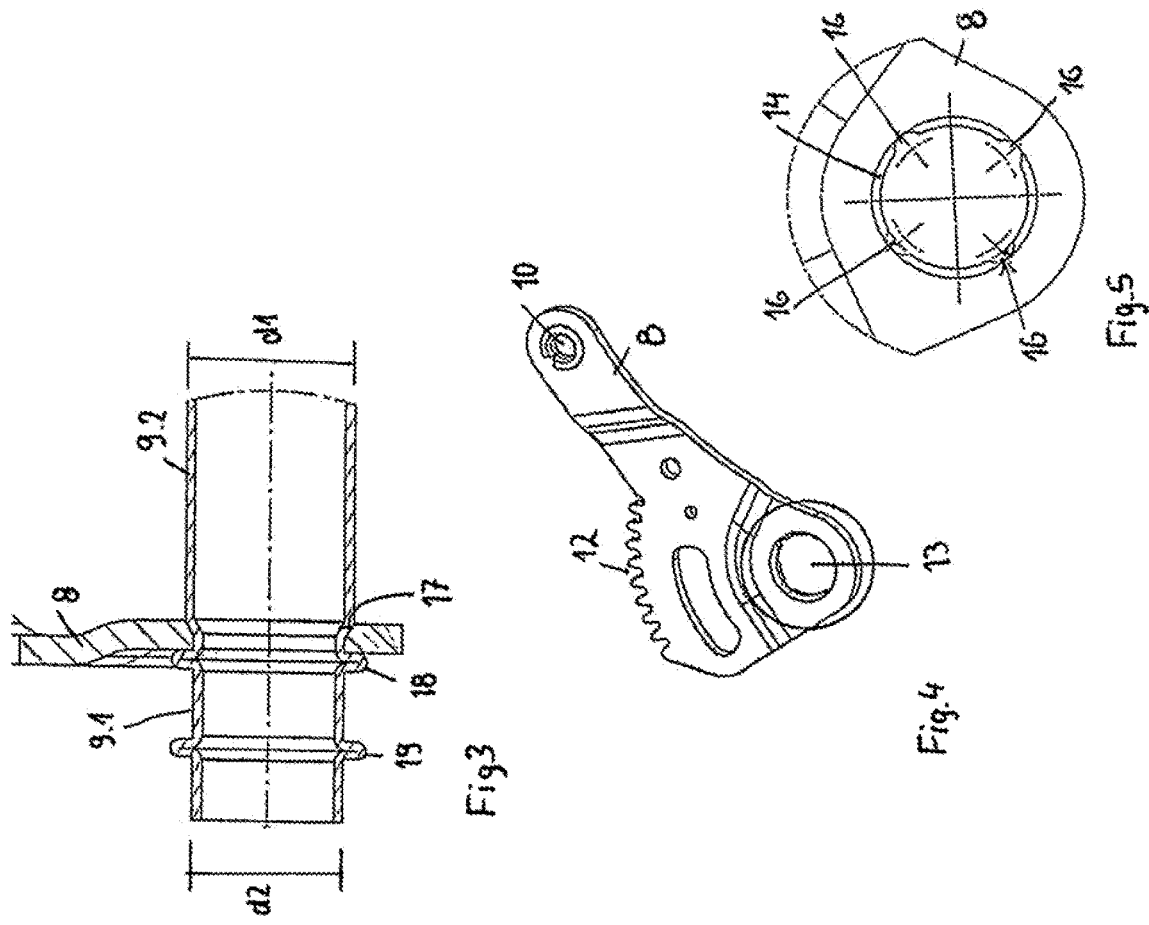

ADJUSTMENT MECHANISM FOR AN OCCUPANT SUPPORT

PRIORITY CLAIM

This application claims priority to German Patent Application No. DE 10 2017 108 218.2, filed Apr. 18, 2017, which is expressly incorporated by reference herein.

BACKGROUND

The present disclosure relates to an occupant support, and particularly to a vehicle seat. More particularly, the present disclosure relates to a height adjustment device for a vehicle seat.

SUMMARY

According to the present disclosure, a height adjustment device of a motor vehicle seat and a method for the production thereof includes a transverse pipe and a pair of links. The transverse pipe has two end-side bearing regions which merge in a central region having a larger diameter. Each link rests on a bearing region of the transverse pipe via a bearing hole.

In illustrative embodiments, the transverse pipe has a first diameter over the entire length thereof. The two ends of the transverse pipe are reduced to a second diameter in order to provide the bearing regions. The central region of the transverse pipe located between the bearing regions maintains the first diameter. A diameter step is provided as a result of this forming between the central region and the bearing regions. The diameter step may be constructed in a conical manner, that is to say, for example, by means of a frustoconical transition.

In illustrated embodiments, the bearing regions receive the links via the bearing holes. The links are pushed onto the bearing regions until each link is in abutment against the diameter step with respect to the central region. Subsequently, an axial force is applied to the link and/or the transverse pipe in order to cold-form the transverse pipe in the region of the diameter step. The conical abutment shoulder of the bearing hole runs up against the diameter step with respect to the central region, and the diameter step is deformed into a conical abutment face which engages the abutment shoulder. At least a portion of the transverse pipe is received in the four axial grooves of the bearing hole.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a side elevation view of a motor vehicle seat,

FIG. 2 is a longitudinal section view through a subassembly of a height adjustment device of the motor vehicle seat, FIG. 3 is an enlarged view of the region A shown in FIG. 2, FIG. 4 is a perspective view of a link having a tooth segment of the subassembly of FIG. 1, FIG. 5 is a plan view of the region of a bearing hole of the link of FIG. 4, FIG. 6 is a longitudinal section view through the link of FIG. 4, and FIG. 7 is an enlarged view of the region B of FIG. 6.

DETAILED DESCRIPTION

A motor vehicle seat 1 as shown in FIG. 1 includes a seat member 2 and a backrest 3. The motor vehicle seat 1 is supported by means of upper rails 4 which are displaceably arranged in lower rails 6 which are secured to the vehicle floor 5 so as to be able to be longitudinally displaced on the vehicle floor. Furthermore, the motor vehicle seat 1 is provided with a height adjustment device. Two front links 7 and two rear links 8 belong to this height adjustment device. The front links 7 rest in a rotationally secure manner on a front transverse pipe (not shown) which is supported with the ends thereof rotatably in a seat member side frame (not shown). The rear links 8 rest in a rotationally secure manner on a rear transverse pipe 9 whose ends are constructed as bearing regions 9.1. With these bearing regions 9.1, the transverse pipe 9 is in each case rotatably supported in a hole of the seat member side frame. The lower ends of the front links 7 and the rear links 8 are rotatably connected to the upper rails 4. To this end, they have at the lower ends thereof corresponding bearing openings 10.

In order to adjust the height of the motor vehicle seat 1, there is provided at a seat side a height adjustment pump which is not illustrated and which is actuated by means of an operating lever 11. The height adjustment pump has a pinion which meshes with a tooth segment 12 of one of the rear links 8. As a result of a corresponding pump movement with the operating lever 11, the pinion of the adjustment pump acts on the tooth segment 12 of the link 8 so that it pivots in one or the other direction about the lower bearing location. This pivot movement is transmitted via the front transverse pipe and the rear transverse pipe 8 and via the seat member side frame to the other links 7, 8 so that the motor vehicle seat 1 is on the whole adjusted upward or downward.

The securing of the links 8 to the rear transverse pipe 9 is explained below by way of example with reference to the link 8 having the tooth segment 12. The securing of the other link 8 which is not directly driven is carried out in a similar manner.

In the starting state, the transverse pipe 9 has a diameter d1 over the entire length thereof. In a first operating step, the two ends of the transverse pipe 9 are reduced to a diameter d2 in order to provide the bearing regions 9.1. The central region 9.2 of the transverse pipe 9 located between the bearing regions 9.1 maintains the diameter d1. A diameter step is provided as a result of this forming between the central region 9.2 and the bearing regions 9.1. The diameter step may be constructed in a conical manner, that is to say, for example, by means of a frustoconical transition.

The link 8 is provided with a bearing hole 13 whose diameter is slightly greater than the diameter d2 of the bearing regions 9.1. The bearing hole 13 has a conical abutment shoulder 14 whose flanks define an opening angle of $\alpha=60°$ between them. Approximately at the center of the sheet thickness b of the link 8, the abutment shoulder 14 merges into a cylindrical wall 15 of the bearing hole 13. This construction can best be seen in FIG. 7.

In the bearing hole 13, there are formed four axial grooves 16 which are each arranged so as to be distributed with a spacing of 90° around the periphery. This construction can best be seen in FIGS. 5 and 7.

In another operating step, the link 8, is pushed by means of the bearing hole 13 thereof onto the bearing region 9.1 until it is in abutment against the diameter step with respect to the central region 9.2. Subsequently, an axial force is applied to the link 8 and/or the transverse pipe 9 in order to cold-form the transverse pipe 9 in the region of the diameter step. During this operation, the conical abutment shoulder 14 of the bearing hole 13 runs up against the diameter step with respect to the central region 9.2, whereby the diameter step is deformed into a conical abutment face 17 which is in abutment with the abutment shoulder 14. In the deformation operation described, material of the transverse pipe 19 flows simultaneously into the four axial grooves 16 of the bearing hole 13. The link is now axially secured on the transverse pipe 9 in a rotationally secure manner and in the direction toward the central region 9.2.

The axial securing of the link 8 in the direction toward the central region 9.2 is carried out only at the diameter step, whereby the need for an otherwise conventional inner bead is eliminated. The starting length of the transverse pipe 9 can thereby be correspondingly shorter, whereby material is saved.

The opening angle of α=60° of the abutment shoulder 14 of the bearing hole 13 promotes the cold-forming operation. Since the abutment shoulder 14 and the support face 17 are in abutment with each other in an oblique plane, during use of the height adjustment device, a gentle force dissipation is produced which has a positive effect on the service-life of the connection between the link 8 and transverse pipe 9.

In order to complete the connection between the link 8 and transverse pipe 9, there is then formed in the bearing region 9.1 an outer bead 18 which is in abutment with the link 8 from the outer side. In this state, this link is axially secured in both directions to the transverse pipe 9. In the bearing region 9.1, another bead 19 is formed with spacing from the outer bead 18. This bead acts as a stop on the seat member side frame.

Prior devices may include multiple beads or an inner bead and may be very material-intensive which has to be compensated for by the provision of a transverse pipe with a correspondingly longer starting length. Furthermore, the inner beads are subjected to significant loads which leads to a shortening of the service-life of the connection between the transverse pipe and the links. In illustrative embodiments, the present disclosure provides a height adjustment device with increased service-life, less material-intensive, and simpler to produce.

In illustrative embodiments, the transition from the central region to the bearing regions of the transverse pipe is carried out via a diameter step, whereby a bead is no longer required at this location. Material is thereby saved, that is to say, the starting length of the transverse pipe may be correspondingly shorter. This may save costs and weight.

Since in the contact region between the bearing regions and the central region conical faces are in abutment with each other, during use of the height adjustment device there is produced a protective discharge of forces between the link and transverse pipe, whereby the service-life of this connection is increased and substantially perpendicular faces are in abutment with each other. The conical abutment shoulder further has the advantage that it promotes the flow behavior of the material during cold-forming.

The invention claimed is:

1. A height adjustment device of a vehicle seat for adjusting a vehicle seat component, the height adjustment device comprising a transverse pipe rotatably supported with two ends thereof configured to provide a bearing region in a hole of a seat member side frame, and two links positioned on the transverse pipe in a rotationally secure and axially secure manner, the two links each having a lower end that is rotatably supported on a vehicle structure and a bearing hole by means of which they rest on the bearing regions, a central region of the transverse pipe having a larger diameter, the central region arranged between the bearing regions, and the links are arranged to face away from the central region and are axially secured by means of an adjacent bead in one direction on the transverse pipe, wherein the transverse pipe further includes a diameter step formed between the central region and the bearing regions there is arranged by a conical abutment face of the transverse pipe, with which a conical abutment shoulder formed in the bearing hole is in abutment so that the links are also axially secured in the other direction to the transverse pipe, and wherein at least one axial groove is formed in the bearing hole and material for securing the links to the transverse pipe in a rotationally secure manner is configured to flow into the at least one groove during a production process.

2. The height adjustment device of claim 1, wherein the conical abutment shoulder of the bearing hole merges approximately at the center of the sheet thickness of the link into a cylindrical wall of the bearing hole.

3. The height adjustment device according to claim 1, wherein the opening angle (α) of the abutment shoulder is between 45 and 70°.

4. The height adjustment device of claim 2, wherein the opening angle (α) of the abutment shoulder is between 45 and 70°.

5. The height adjustment device of claim 3, wherein the opening angle (α) is 60°.

6. The height adjustment device of claim 4, wherein the opening angle (α) is 60°.

7. A method for producing a height adjustment device of a motor vehicle seat, the method comprising the steps of providing a transverse pipe with a constant diameter, reducing the diameter of the transverse pipe at both ends in order to provide bearing regions with the diameter, between which a central region with the original diameter remains, wherein the transition between the bearing regions and the central region is carried out in each case in a diameter step, pushing the link by means of the bearing hole thereof onto the bearing region until it is in abutment with the diameter step between the central region and bearing region, applying an axial force to the link and/or the transverse pipe in order to cold-form the transverse pipe in the region of the diameter step to form a conical abutment face for a conical abutment shoulder of the bearing hole and for material flow into the at least one groove of the bearing hole, and forming a bead which is in abutment with an outer side of the link.

* * * * *